United States Patent Office 2,768,028
Patented Oct. 23, 1956

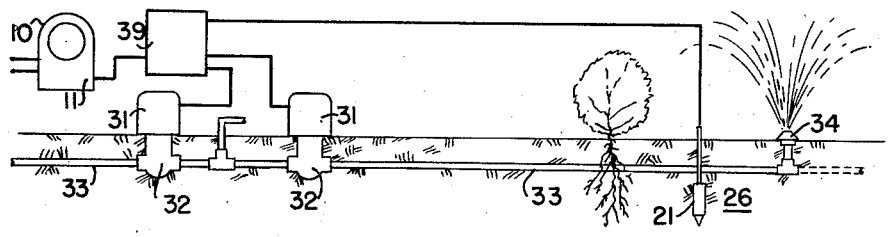
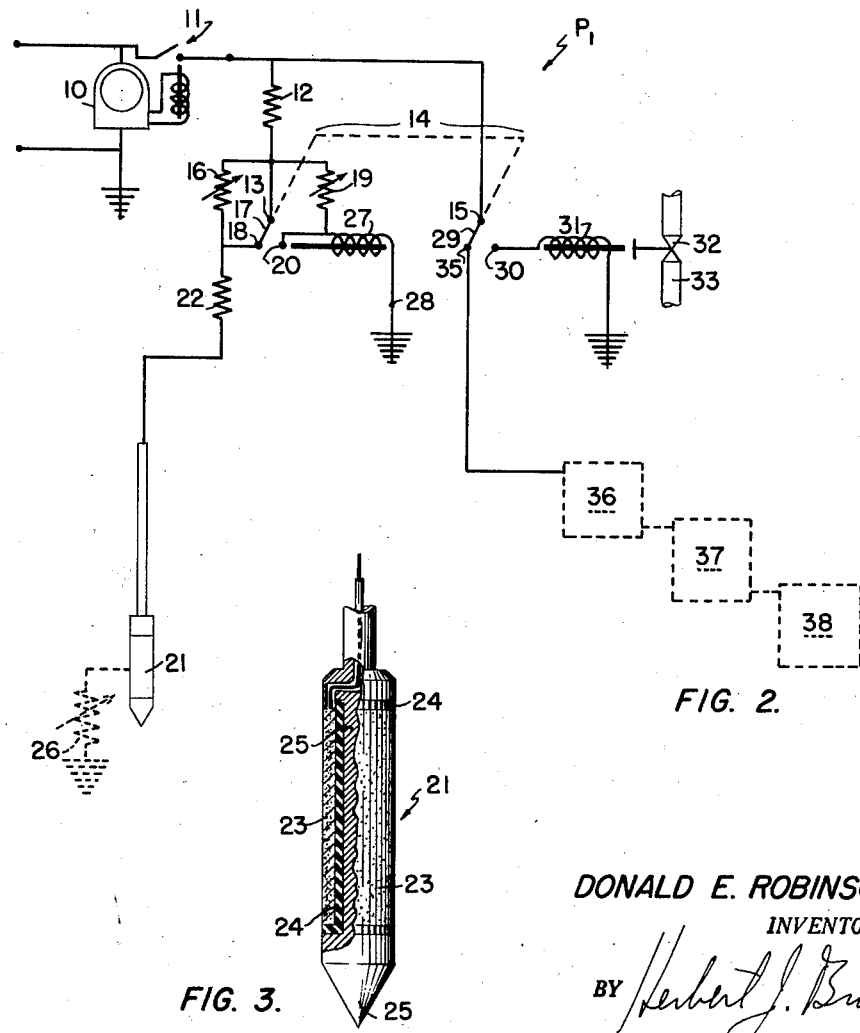

2,768,028

AUTOMATIC WATERING CONTROL

Donald E. Robinson, Fort Worth, Tex.

Application March 24, 1955, Serial No. 496,387

3 Claims. (Cl. 299—27)

This invention relates to automatic irrigation systems and has reference to electrical controls therefor.

Irrigation for the proper maintenance of plant life in lawns and gardens is an inconvenience to many people without the time to give it proper attention. In some cities the daytime water pressure is insufficient to operate sprinkler systems, in other cities daytime irrigation is prohibited by ordinance, and in many sections of the country daytime irrigation is wasteful because evaporation of water accelerates as an increased temperature lowers the relative humidity. Irrigation of lawns and gardens by night often presents a property owner with the choice of losing sleep or wasting water.

Clock operated switches and magnetic valves have long been commercially available. Combinations of these devices have been used to activate and deactivate irrigation systems at predetermined hours. While saving labor these clock activated systems tend to be wasteful because they irrigate even at times when irrigation is not needed, often to the detriment of the plants they were meant to benefit. These systems do not take into account variations in water pressure which would necessitate longer periods of irrigation.

To diminish waste and inefficiency other systems have been built to regulate irrigation by constant measurements of humidity, temperature, or soil mosture content. Such systems may become operative at inconvenient or unlawful times to the detriment of the property owner. To overcome this shortcoming these systems have used in conjunction with clock operated switches so that periodic measurements of humidity, temperature or soil moisture content may be made to control an irrigation system.

The determination of soil moisture content by measurements of the electrical resistivity therein offers means for ascertaining when plants should be irrigated. The resistivity of the soil has been previously utilized by using the soil itself as an electrical conductor between two buried elements, between which an electrical potential difference exists. Devices made for this purpose utilize the changes in soil resistivity caused by changes in soil moisture content to control the grid elements of radio tubes such as pentodes or thyratrons and thereby energize solenoids or magnetic valves. Accurate regulation of an irrigation system can thus be accomplished. The use of radio tubes in such a device, however, handicaps that device with certain inherent shortcomings of radio tubes themselves. A large percentage of the energy consumed by a radio tube is consumed in heating the cathode of the tube and is subsequently dissipated as heat. A small irrigation system so equipped may offset its saving of water with a wasting of electricity. A radio tube is self-consuming in that the unidirectional flow of electrons from the cathode results in attrition of that element until it is consumed at one point and the tube is then burned out; radio tubes thus have a limited life and must be replaced periodically. Most circuits containing radio tubes require auxiliary devices such as transformers, rectifiers, and condensers which dissipate additional energy and complicate their circuitry.

Previously known devices which control irrigation by a clock operated switch in conjunction with a radio tube device actuated by soil moisture content have of themselves additional detrimental characteristics. Existing devices generally measure soil moisture content only at one location without taking into consideration either the different water needs and root depths of various plants or the variations in soil moisture content caused by drainage, shade and other factors. Some plants are sturdier than others and are able to sustain themselves through periods of insufficietn watering while other plants will perish under the same conditions. Existing devices do not give priority to certain plants or areas of lawn or garden under conditions of limited volume and pressure of water available to the irrigation system.

It is an important object of this invention to provide a simple and useful electrical control system for the irrigation of plants, said system being fully automatic to operate at predetermined hours according to the needs of the plants.

It is a further object of this invention to provide a simple and useful electrical device of the type herein described which operates without radio tubes or other elements with a self-consuming characteristic so that the elements of the device will neither be wasteful of electricity nor subject to periodic replacement.

It is a further object of this invention to provide a device, as herein described and for the purposes previously specified, which is capable of measuring soil moisture content about a multitude of plants and places and of directing proper irrigation to each of these plants or places in turn.

It is a further object of this invention to provide a device, as herein described and for the purposes previously specified, so constructed that the soil moisture content for plants of various root depths may be measured at various sub-surface levels and each of the various plants may be irrigated to the proper soil moisture content at its roots.

It is a further object of this invention to provide a device, as herein described and for the purposes previously specified, which may be adjusted or preset to maintain different soil moisture content percentages for different plants or different areas whereby plants of different irrigation needs may be properly cared for.

It is a further object of this invention to provide a device, as herein described and for the purposes previously stated, which may be adjusted or preset so that the irrigation of certain plants or areas will take priority over others at times of low water pressure or inclement weather, each plant or area to be irrigated having an order of priority by which it receives water.

In the drawings:

Figure 1 is a diagrammatic view showing generally the relationship between the control device, its functional sections, and the controlled irrigation system.

Figure 2 is a schematic diagram of the control device illustrating its functional elements and the interrelationships thereof.

Figure 3 is a partially diagrammatic plan view of the buried probe showing its parts and illustrating its function.

It will be noted from the drawings that the clock 10 operates a switch 11 which connects power line current through the voltage dividing resistor 12 to the low voltage primary current binding post 13 of the double pole double throw relay 14 and connects line current directly to the high voltage primary current binding post 15 of the relay 14. A bypass variable resistor 16 is electrically connected across the low voltage armature 17 of the relay 14 to its normally closed contact point 18; the other variable resistor 19 is electrically connected from the same low voltage primary current binding post 13 across the low voltage armature 17 to its normally open contact point 20. The normally closed contact point 18 of the relay 14 is electrically connected to the probe 21 through the fixed resistor 22. The probe 21 is essentially a mass of carbonaceous electrical conducting material of which the special construction drawn and described herein is largely for purposes of illustration. A cylindrical body of carbonaceous electrical conducting material 23 is insulated by a suitable electrical insulating material 24 from a supporting metallic point and bar 25 which lends strength to the carbonaceous cylinder 23 by projecting through its center and forming either end of the probe. The carbonaceous cylinder makes electrical contact with the sub-surface soil 26 the varying resistivity of which is determined by its moisture content as functionally illustrated in Figure 2. The normally open contact point 20 on the low voltage side of the relay 14 is electrically connected to a secondary current binding post 27 of the relay 14; the other secondary current binding post 28 of the relay 14 is connected to any internal common ground connection.

The low voltage armature 17 and the high voltage armature 29 of the relay 14 are mechanically connected to make and break contact with their respective contact points in unison. The normally open contact point 30 on the high voltage side of the relay 14 is electrically connected to a solenoid 31 which is thence electrically connected to any internal common ground connection. A valve 32 is so constructed and positioned as to be operable by the solenoid 31 and to control the flow of water through the pipes 33 and the watering devices 34. A normally closed contact point 35 on the high voltage side of the relay 14 is electrically connected to successive identical or similar devices 36, 37, 38, etc. A number of these control devices may be mounted adjacently in a frame or case 39 for convenient operation.

In a typical operation of this device the clock 10, on reaching a previously set hour, closes the switch 11 allowing line current to reach the primary current binding posts 13 and 15 of the relay 14. The voltage dividing resistor 12 allows only a small portion of the current to reach the low voltage binding post 13 as compared to that supplied to the high voltage binding post 15. There are two bypass variable resistors 16 and 19 connected from the low voltage binding post 13 across the low voltage armature 17 of the relay 14 to the two contact points 18 and 20 with which that armature may make contact. When current first reaches the low voltage armature 17 the relay 14 is in its inactivated or normal state and the low voltage armature 17 is in contact with its normally closed contact point 18. The low voltage armature 17, in this position acts as a short circuit across the variable resistor 16 and the voltage arriving at the low voltage binding post 13 will be divided between the probe 21 circuit and the secondary circuit of the relay 14 according to the relative resistances of these two circuits. It will be noted that the fixed resistor 22 is in the circuit of the probe 21 and that the variable resistor 19 is in the secondary circuit of the relay 14. The division of voltage may hence be regulated by the variable resistor 19 within the limitations of the resistance imposed by the fixed resistor 22 and the other resistances in the circuits. Since a part of the circuit of the probe 21 is sub-surface soil 26, the electrical resistivity of which is governed by its moisture content, the current passing through the secondary circuit of the relay 14 may be regulated by a combination of the moisture content of the soil 26 and the variable resistor 19. With the latter properly adjusted the soil moisture content alone can determine the current flowing through the secondary circuit of the relay 14. By proper adjustment of the variable resistor 19 various percentages of soil moisture content may thus be utilized to determine the conditions under which enough current will flow through the secondary circuit of the relay 14 to cause it to be activated from its normal state. Assuming that the clock 10, at its preset time, now closes the switch 11 and that the variable resistor 19 is properly adjusted, the soil moisture content will determine whether or not the relay 14 will be activated. If the moisture content of the soil 26 is at or above the required percentage its resistance will be low enough to establish such a current distribution as will prevent the secondary circuit of the relay 14 from receiving enough current to be activated. In this status of the relay 14 as illustrated in Figure 2, the high voltage armature 29 is also in its normal position and current is passed on through its normally closed contact point 35 to successive identical or similar devices 36, 37 and 38 for irrigation control purposes to other plants or areas of lower priority.

Should the moisture content of the soil 26 fall below the required precentage, as preset by the variable resistor 19, the electrical resistance therein will increase, the current flowing through the probe circuit will decrease, the current flowing through the secondary circuit of the relay 14 will increase, and the relay 14 will be activated to its abnormal position. In this status the high voltage armature 29 makes contact with its normally open contact point 30 delivering electrical current to the solenoid 31 which opens the valve 32 causing irrigation to the area in need through the pipe 33 and the watering devices 34. Said activation simultaneously causes the high voltage armature 29 to break contact with the normally closed contact point 35 thus disconnecting all successive devices of lower priority and cutting off irrigation in a less critical area to maintain adequate pressure where the water is most needed. In an irrigation system employing several of these devices in series, any one device will thus take priority over all devices wired after it and be subordinated to all devices preceding it in the circuit. In this abnormal position of the relay 14 the low voltage armature 17 no longer acts as a short circuit across the variable resistor 16 but now acts as a short circuit across the variable resistor 19. The variable resistor 16 now serves as a governor in the probe circuit to establish a higher soil moisture percentage requirement to deactivate the relay 14 than was required to activate that relay. This arrangement protects an irrigation system from erratic behavior due to equilibrium in required and actual soil moisture conditions or oscillatory action of the relays.

The illustrated and described form of this invention has been predicated on the assumption that the electrical current available for its operation will be A. C. line current in which case A. C. relays would be used. In the event that it is desirable to operate this invention from a source of D. C. current, D. C. relays may be used. Should D. C. relays be desirable for use with A. C. current they may be so adapted for use with this invention by the insertion of a rectifier of the selenium or other suitable type into the circuit adjacent to the voltage dividing resistor 12 at its side opposite the line current connection and a capacitor across the relay.

This invention is not limited to the exemplary construction herein shown and described, but may be made in various ways within the scope of the appended claims.

What is claimed is:

1. In combination with an irrigation system including a valve therein, a source of electrical power including two conductors having a potential electrical difference, a voltage dividing resistor connected to one conductor of said source of electrical power, a double pole double throw relay, a first pole of which is connected to said voltage dividing resistor, and a second pole of which is connected to the other said conductor of said source of electrical power, two variable resistors wired each to said first pole and wired thence respectively to the two contact points thereof, an electrical conducting surface in electrical connection with the earth and thereby subjected to variable electrical resistance in according with the moisture content thereof, said surface also being connected with one contact point of said first pole, said electrical relay actuator being connected with the other contact point of said first pole and with the other conductor of said source of electric power, a second electric actuator connected with a contact point of said second pole and thence connected to the said other conductor of said source of electric power, and mechanical means connecting the last said actuator with the valve of said water system.

2. In combination with a device as defined in claim 1, a clock operated switch having its armature wired to the first said conductor of said source of electrical power and having its contact point wired to said voltage dividing resistor and to said high voltage pole of said double pole double throw relay.

3. In combination with a device as defined in claim 1, a successive similar device wired to the other contact point of said high voltage pole of said double pole double throw relay.

References Cited in the file of this patent
UNITED STATES PATENTS

| | | |
|---|---|---|
| 2,031,146 | Dodge | Feb. 18, 1936 |
| 2,599,862 | Ray | June 10, 1952 |
| 2,721,101 | Richard | Oct. 18, 1955 |